United States Patent [19]

Balzola Elorza

[11] Patent Number: 5,102,283
[45] Date of Patent: Apr. 7, 1992

[54] AUTOMATIC POSITIONER FOR STORES

[76] Inventor: Martin Balzola Elorza, calle Urquijo, 3, Las Arenas-Getxo, Spain, 48930

[21] Appl. No.: 651,534

[22] Filed: Feb. 6, 1991

[30] Foreign Application Priority Data

Feb. 8, 1990 [ES] Spain .................................. 900365

[51] Int. Cl.⁵ ............................................ B65G 65/02
[52] U.S. Cl. .................................. 414/404; 414/416; 414/626; 414/627; 414/912
[58] Field of Search ............... 414/404, 416, 618, 619, 414/626, 627, 422, 660, 912; 901/16

[56] References Cited

U.S. PATENT DOCUMENTS

| | | | |
|---|---|---|---|
| 3,490,622 | 1/1970 | Brackin | 414/618 X |
| 3,884,363 | 5/1975 | Ajlouny | 901/16 X |
| 4,005,782 | 2/1977 | Crockett | 901/16 X |
| 4,229,136 | 10/1980 | Panissidi | 901/16 X |
| 4,242,025 | 12/1980 | Thibault | 901/16 X |
| 4,597,707 | 7/1986 | Cornacchia | 901/16 X |
| 4,600,358 | 7/1986 | Graf | 901/16 X |
| 4,801,236 | 1/1989 | Katzenschwanz | 414/416 |
| 5,049,023 | 9/1991 | Knyazkin et al. | 414/416 X |

Primary Examiner—David A. Bucci
Attorney, Agent, or Firm—Fleit, Jacobson, Cohn, Price, Holman & Stern

[57] ABSTRACT

A positioner suitable for use in warehouses where stored products are carried with on pallets or on horizontal forks. The positioner is designed to load, unload, select, store, pull out, prepare orders, etc., of any kind of the aforementioned products. The positioner has a structure with two vertical masts with a bolster moving vertically between them, a slider slidably mounted on this bolster, a longitudinal frame on which moves a second slider carrying a vertical column with its free end provided with an air hole or clamp to carry out the transfer of products, with operations monitored and controlled by computer.

6 Claims, 2 Drawing Sheets

AUTOMATIC POSITIONER FOR STORES

PURPOSE OF THE INVENTION

This invention is directed for use in stores or warehouses where pieces, boxes, containers and, in general, all kind of products will be handled with horizontal forks and/or pallets in unloading, classifying and later preparing such orders.

One purpose of the invention is to provide an automatic manipulator which positions products into their appropriate shelves or storing places upon their arrival, and later pulling them out when it is necessary to fill a particular order.

Whenever products, individually or by groups, are maintained in a known, preselected and fixed position, this positioner may carry out all the operations related to loading, unloading, classification and exchanging of such products with or without any manual manipulation, by means of a simple order received from a computer.

BACKGROUND OF THE INVENTION

Since stores and warehouses equipped with pallets and/or forklifts vary in size, manipulate various products of varying dimension and use various combinations of shelves and supporting structures, numerous factors effect their system of classification. These factor are those related to the unloading and the corresponding transport, storing, selection and pulling out of containers to form the orders based on client names or on destinations of complete or partial containers.

All these operations are typically automated by the combined use of barrows, transelevators, various carriers, order-collectors, etc. In summary, a confusing assortment of devices and mechanisms are employed to automatically carry out a series of usual operations in warehouses and stores.

There is no known manipulator or device in the prior art capable of independently carrying out all the aforementioned functions required at warehouses and stores. That is, there are no known manipulators capable of automatically carrying out the exchanging of containers, as well as the selection and transfer of products from one container to another container or place.

DESCRIPTION OF THE INVENTION

The manipulator of this invention solves all these problems in a completely satisfactory way, based on a simple but very useful structure. This new system for the transference of products, uses a double fork and an erecting crane with a rotatory mast or transelevator, in such a way that the manipulator may independently carry out the aforementioned functions simply and usefully.

The proposed manipulator is based on a structure having two separated vertical masts depending from an erecting crane slider and arranged perpendicularly to the forks. Between both masts there is a space for the passage of both the containers and a horizontal, longitudinal frame which is arranged parallel to the forks. The fork projects from the external border of one of the containers to the opposed border of the container located on the opposite fork.

A second slider slides longitudinally on the longitudinal frame and is provided with a vertical rigid or telescopic column. Having the same length as the container, this column has at its free end an air hole or clamp for extracting the pieces or boxes out of the container.

In the same way, the longitudinal frame slides laterally along an horizontal bolster which itself slides vertically between the two masts.

Based on these three movements vertical, transverse and longitudinal, the lower end of the vertical column can reach any point inside the container, and when going out of that container, is capable of descending again to any other point on a following container. In this way, the complete transference of products from one container to another is made possible.

As a consequence of these three directions of movement, it is also possible in the same way to carry out a storing or a classification of pieces.

As a variant, the positioner may incorporate double retractable forks, instead of the conventional forks, and a transelevator instead of an erecting crane.

Thus, the objective of the positioner of this invention is to carry out the necessary operations to order all the products in a store or warehouse into their corresponding shelves at their arrival, and pulling them out later to fill orders.

Since the positioner may handle containers, boxes, independent pieces, bags, etc, in all cases it will be ordered by an operator through a computer with the appropriate orders, in such a way that the positioner itself will carry out the necessary operations.

DESCRIPTION OF THE DRAWINGS

To foster a better understanding of the invention reference is made to the following non-limiting figures.

PREFERRED EMBODIMENT OF THE INVENTION

Figure 1:
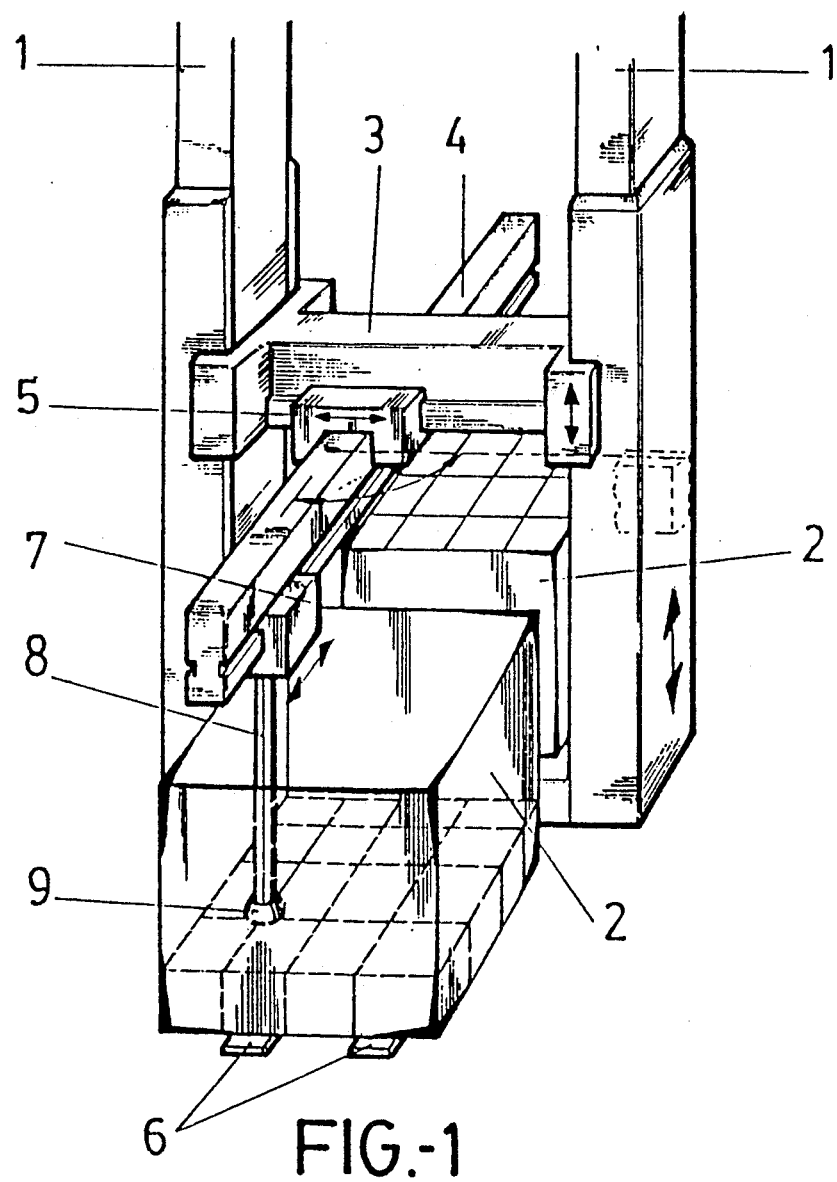
FIG. 1 shows a perspective view of the preferred embodiment of the invention.

In view of the drawings, and particularly of FIG. 1, the positioner of the invention has a structure having two masts (1) arranged vertically and separated to allow the passage of a container (2) containing a series of products.

Between the masts (1) there is a horizontal bolster (3) ascending and descending, and projecting from the bolster, a horizontal, longitudinal frame (4) that rotates about a vertical axle in the horizontal plane, and at the same time, is capable of sliding transversely on a slider (5).

The ends of the longitudinal frame (4) are long enough to reach the opposed borders of the containers (2) when they are on the corresponding forks (6), as shown in FIG. 1.

The frame (4) carries a second slider (7) sliding longitudinally along the frame. The second slider carries a vertical column (8) with its lower end having a suction hole or clamp (9) to pull out the products from inside the containers (2).

The three described movements: the transverse movement of the slider (5) and consequently of the frame (4); the longitudinal movement of the second slider (7) and consequently of the column (8); and the ascending and descending movement of the bolster (3)—allows the suction hole or the clamp (9) to pull out a product from one of the containers (2) for the purpose of transfering it to another container.

In this preferred embodiment, the frame (4) is provided, at the point of attaching the second slider (5), with an articulation having a vertical rotatory axis. This design allows the frame to fold into the frontal plane of the masts (1), and thus, avoid collision with containers introduced into or pulled out of the positioner.

Figure 2:
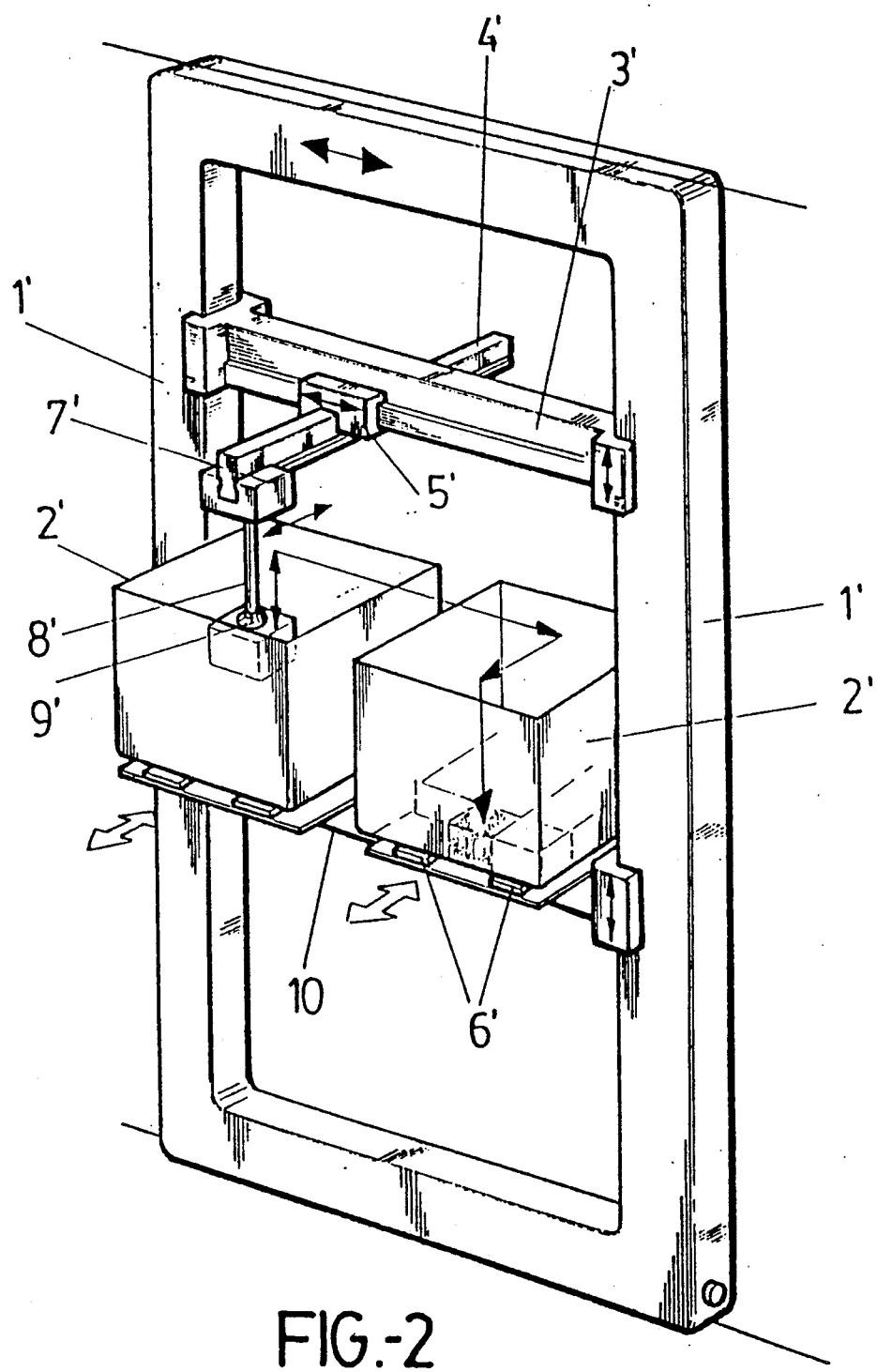
FIG. 2 shows a perspective view of a variant of the invention, where the system for the transference of pieces is comprised of a transelevator with two retractable forks, but retains the general structure and basic characteristics of the positioner represented in the previous figure.

According to a variant of the invention, the positioner may also be comprised of a pair of vertical masts (1') and a bolster mounted therebetween (3') that vertically slides. Mounted on the bolster is a longitudinal, horizontal frame (4') having a second slider (7') movably attached with a vertical column (8') having a lower end provided with an air hole or clamp (9') to pull out a product from one container (2') and transfer it to another container (2'). This is shown in FIG. 2.

In this case, the positioner employs a double fork (6') and a transelevator. The transelevator (10) is arranged transversely between the masts (1') and slides up and down. There are two forks (6'), as has been said previously, retractable to be able to hold the containers (2') in which it has to be transferred the pieces or boxes from one to another.

In this embodiment, the vertical movements of the double forks (6') may be independent of each other.

The described positioner, in its two embodiments, may offer variable speeds and accelerations, using acceleration and deceleration ramps, in such a way, that the maximum speeds achieved are those allowed by the accelerating and decelerating ramps and the corresponding runs. In this way, the possibility of collision at high speed in the pulling out and depositing operations is avoided.

The movement of the various elements of the positioner is actuated by continuous motors with speed controls. Additional motors may be employed for fine adjusting. The runs are monitored by "encoders", autoflexion photocells and fixed signals that are activated and compared with positional data stored in memory so as to define stop points. These mechanisms are also employed in assisting the visualization of the runs by and consequently promotes more precise control.

All the operations of the positioner are monitored by a computer that stores and processes all the data related to the date, size, types and relative positions of the contained products and also data regarding the pulling out operations, origin, destination, distribution, classification, etc.

Accordingly, it is possible to handle in stores and warehouses all kinds of products (containers, boxes, pieces, trays, etc.) employing only a single operator.

The materials, shape, size and arrangement of the elements may be varied without departing from the essence of the invention. The terms with which this description has been written must be considered broadly and with least limitations.

I claim:

1. An automatic positioner for classifying products into containers prepared at their arrival and later retrieving them to form a specific order, comprising two masts vertically arranged and separated by a distance longer than that of said containers; a bolster ascendingly and descendingly slidably mounted between said two masts; a longitudinal frame slidably mounted on a slider which is slidably mounted on the bolster; said longitudinal frame is provided with a second slider that moves longitudinally along said frame and carries a vertical column, said vertical column having a lower end provided with a holding means to pull out corresponding products destined to be transferred from one container to another; said containers being arranged on corresponding forks attached to said masts.

2. The automatic positioner as claimed in claim 1. said longitudinal frame and said bolster are long enough to reach external and opposed borders of two adjacent containers arranged on the forks.

3. The automatic positioner as claimed in claim 1, where said vertical column is long enough to reach a bottom of the corresponding container.

4. The automatic positioner as claimed in claim 1, where said longitudinal frame is mounted to said slider in such a manner as to permit said frame to rotate in a horizontal plane with respect to the bolster.

5. The automatic positioner according to claim 1, where said holding means is an attached pneumatic suction device.

6. The automatic positioner according to claim 1, where said means is a clamp.

* * * * *